(12) United States Patent
Ghodsi

(10) Patent No.: US 9,213,386 B2
(45) Date of Patent: Dec. 15, 2015

(54) APPARATUSES AND METHODS AND FOR PROVIDING POWER RESPONSIVE TO A POWER LOSS

(71) Applicant: Micron Technology, Inc., Boise, ID (US)

(72) Inventor: Ramin Ghodsi, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 365 days.

(21) Appl. No.: 13/657,444

(22) Filed: Oct. 22, 2012

(65) Prior Publication Data

US 2014/0115373 A1 Apr. 24, 2014

(51) Int. Cl.
| | | |
|---|---|---|
| *G06F 1/32* | (2006.01) | |
| *G06F 11/30* | (2006.01) | |
| *G06F 1/30* | (2006.01) | |
| *G06F 13/16* | (2006.01) | |

(52) U.S. Cl.
CPC ............... *G06F 1/30* (2013.01); *G06F 1/3203* (2013.01); *G06F 1/3268* (2013.01); *G06F 13/1694* (2013.01)

(58) Field of Classification Search
CPC ....... G06F 1/30; G06F 1/3203; G06F 1/3268; G06F 13/1694
USPC .................................. 713/300, 320, 322, 340
See application file for complete search history.

(56) References Cited

U.S. PATENT DOCUMENTS

| | | | |
|---|---|---|---|
| 5,032,892 A | 7/1991 | Chern et al. | |
| 5,519,831 A | 5/1996 | Holzhammer | |
| 5,880,925 A | 3/1999 | DuPre et al. | |
| 6,124,625 A | 9/2000 | Chern et al. | |
| 6,184,568 B1 | 2/2001 | Protigal et al. | |
| 6,344,961 B1 | 2/2002 | Naito et al. | |
| 6,448,628 B2 | 9/2002 | Chern et al. | |
| 6,990,603 B2 | 1/2006 | Strasser | |
| 7,451,348 B2 | 11/2008 | Pecone et al. | |
| 7,586,174 B2 | 9/2009 | Togashi et al. | |
| 7,613,877 B2 | 11/2009 | Shimozono et al. | |
| 8,090,988 B2 | 1/2012 | Hoang | |
| 8,669,828 B1* | 3/2014 | Wong et al. .................... 333/12 |
| 2002/0017700 A1 | 2/2002 | Mori et al. | |
| 2005/0046991 A1* | 3/2005 | Nakazato ........................ 360/69 |
| 2005/0152203 A1 | 7/2005 | Choi et al. | |
| 2006/0267412 A1* | 11/2006 | Kuo ................................ 307/89 |
| 2009/0251862 A1 | 10/2009 | Knickerbocker et al. | |
| 2009/0290282 A1 | 11/2009 | Knickerbocker | |

(Continued)

FOREIGN PATENT DOCUMENTS

KR    10-2011-0119224    11/2011

*Primary Examiner* — Michael J Brown
(74) *Attorney, Agent, or Firm* — Dorsey & Whitney LLP

(57) ABSTRACT

Apparatuses and methods for providing power responsive a power loss are disclosed herein. A power chip may comprise a power sensor, a write command control logic, and an array. The power sensor may be configured to detect a power loss of a power supply and provide a power loss control signal responsive, at least in part, to detecting the power loss of the power supply. The write command control logic may be coupled to the power sensor and may be configured to receive the power loss control signal. The write command control logic may be further configured to provide a write command responsive, at least in part, to receipt of the power loss control signal. The array may include a plurality of capacitors configured to store power and further configured to provide power during the power loss.

26 Claims, 6 Drawing Sheets

(56) References Cited

U.S. PATENT DOCUMENTS

| | | |
|---|---|---|
| 2010/0008175 A1 | 1/2010 | Sweere et al. |
| 2010/0164084 A1 | 7/2010 | Lee et al. |
| 2010/0244189 A1 | 9/2010 | Klootwijk et al. |
| 2010/0308435 A1 | 12/2010 | Nowak et al. |
| 2010/0311371 A1 | 12/2010 | Abe et al. |
| 2011/0027962 A1 | 2/2011 | Bernstein et al. |
| 2011/0031598 A1 | 2/2011 | Lee et al. |
| 2011/0108948 A1 | 5/2011 | Kim et al. |
| 2012/0020027 A1* | 1/2012 | Dungan et al. ............... 361/718 |
| 2012/0098343 A1* | 4/2012 | Harris et al. .................. 307/48 |
| 2013/0039113 A1 | 2/2013 | Cremer et al. |
| 2013/0109135 A1 | 5/2013 | Lee et al. |
| 2013/0194032 A1 | 8/2013 | Hollis |
| 2014/0320201 A1 | 10/2014 | Hollis |

\* cited by examiner

APPARATUSES AND METHODS AND FOR PROVIDING POWER RESPONSIVE TO A POWER LOSS

TECHNICAL FIELD

Embodiments of the present invention described herein relate generally to memories, and more particularly, in one or more of the illustrated embodiments, providing power in the event of a power loss, for example, to complete an operation in a non-volatile memory.

BACKGROUND OF THE INVENTION

Non-volatile memory storage devices, such as solid state drives (SSDs), use solid state memory to store data. These devices have, in recent years, presented an alternative to conventional hard disk drives (HDDs) that have slower access times. In addition, non-volatile memory storage devices also offer substantially lower power consumption and failure rates than HDDs, making these devices particularly useful for the implementation of modern enterprise storage solutions.

Non-volatile memory storage devices are not without their drawbacks, however. That is, in comparison to volatile memories, such as SRAM or DRAM, memory operations, particularly write operations, may impose significant latency. As a result, a queue may be required to store write commands and/or data during operation until non-volatile memory commands can execute each command serially. One known implementation for this queue involves using a volatile memory buffer cache such that write data are written first to the volatile memory buffer cache and subsequently to solid state memory of the device when the solid state memory is available. In some instances, limited volatile memory cache may exist within the non-volatile memory chip and may be used for this purpose.

By using this approach, data intended to be stored in a solid state device may be lost if the device loses power while data is being written to the volatile memory. To prevent this, typical implementations have used capacitors, and in particular supercapacitors, to provide power in the event of power failures in the device. Power may be provided, for instance, until data has been written from the buffer cache to nonvolatile memory. Using capacitors in this manner is an expensive and often complex solution, however.

DETAILED DESCRIPTION

Apparatuses and methods for providing power responsive to (e.g. during) a power loss are disclosed herein. In accordance with one or more embodiments of the present invention, a power chip may detect a voltage drop and in response may provide power to one or more integrated circuits and/or a write command. As used herein, the term apparatus may refer to, but is not limited to, for example, a device(s), a system(s), a chip(s), a chip package(s), a drive(s), a die (dice), or any combination or subcombination of the same. Certain details are set forth below to provide a sufficient understanding of embodiments of the invention. However, it will be clear to one having skill in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Embodiments of the invention may be used with vertically integrated memory, such as three-dimensional non-volatile memory. Vertically integrated memory, unlike two-dimensional memory, integrates a plurality of horizontally stacked memory arrays within a single package. That is, memory arrays may be horizontally "tiered" in a package such that the plurality of memory arrays operate as a single memory device.

Figure 1:
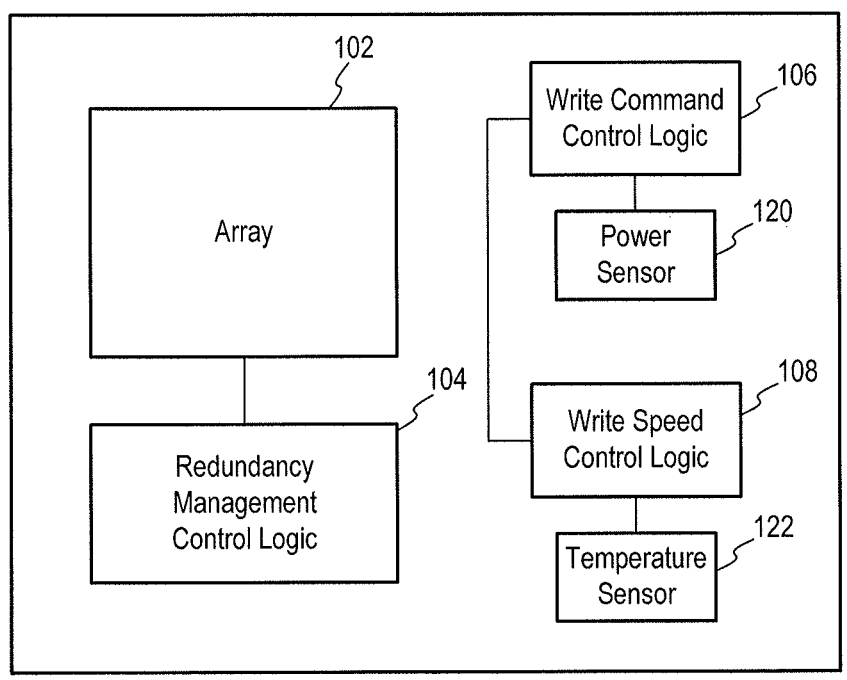
FIG. 1 is a block diagram of a power chip according to an embodiment of the invention.

FIG. 1 is a block diagram of a power chip 100 according to an embodiment of the invention. The power chip 100 may include an array 102, a redundancy management control logic 104, a write command control logic 106, a write speed control logic 108, a power sensor 120, and a temperature sensor 122. The array 102 may comprise a plurality of capacitors. The capacitors may be configured to store power that may be used in the event of a power loss. In some embodiments, the capacitors of the array 102 may, for instance, be formed from vertically integrated memory. In one embodiment, and as will be explained in more detail below, each of the capacitors included in the array 102 may be formed using any fabrication process known in the art, now or in the future, including fabrication processes similar to those used to create three-dimensional non-volatile memory (e.g., three-dimensional NAND memory). In some embodiments, fabrication processes used to create three-dimensional non-volatile memory may be used. Because the capacitors may be formed in this manner, each of the capacitors may be addressable, for instance, using an address decoder (not shown) coupled to, or included in, the array 102.

Each of the capacitors of the array 102 may be the same size, or the capacitors may vary in size. In one embodiment, each of the capacitors may be substantially the same size as three-dimensional non-volatile memory cells known in the art, or may be larger than three-dimensional non-volatile memory cells. Each of the capacitors may be configured to have a same capacitance, for example, one picofarad, or may be configured to have varying capacitances.

The redundancy management control logic 104 may be coupled to the array 102 and may be configured to selectively enable or disable one or more capacitors of the array 102, for instance, by individually addressing a tier of the array 102 or by individually addressing each capacitor of the array 102. In one embodiment, the redundancy management control logic 104 may be configured to disable any defective capacitors. A capacitor may be defective if, for example, the capacitor fails to be addressed properly or fails to provide capacitance satisfying a particular threshold. Whether a capacitor is defective may be determined by the redundancy management control logic 104 or an external device, such as a tester (not shown).

The power sensor 120 may be configured to detect a power loss of a power supply. A power loss may be represented by, for example, a decrease in voltage and/or current provided by the power supply, a decrease in power, disruption in the provision of power by the power supply, or events that effect the provision of power by the power supply. The temperature sensor 122 may be configured to measure temperature. The power sensor 120 may be coupled to the write command control logic 106 and may further be configured to provide a power loss control signal to the write command control logic 106 responsive, at least in part, to detecting a power loss, (e.g., voltage drop, brownout, undervoltage) of a power supply. The temperature sensor 122 may be coupled to the write speed control logic 108 and configured to measure one or more temperatures inside and/or outside of the power chip 100. The temperature sensor 122 may be configured to provide one or more temperature signals to the write speed control logic 108 indicating the one or more measured temperatures, respectively.

As described, the write command control logic 106 may be configured to receive the power loss control signal from the power sensor 120. In response, the write command control logic 106 may provide a write command to a controller, for instance, of a storage device (not shown), such as a solid state drive (SSD). In other embodiments, the write command control logic 106 may additionally, or alternatively, be configured to provide the write command to a buffer cache (e.g., DRAM, SRAM) of the storage device. As will be explained in more detail below, providing this signal may cause the storage device to write data stored in a buffer cache to one or more integrated circuits, such as a memory die, using power stored in the array 102.

The write speed control logic 108 may be coupled to the write command control logic 106 and may be configured to provide a write speed control signal to at least one of the write command control logic 106 and the controller. The write speed control signal may indicate a speed at which data is to be written from the buffer cache to a memory die in response to the write command provided by the write command control logic 106, and may be based, at least in part, on the temperature signal provided by the temperature sensor 122. In some embodiments, the write speed control signal further may be based on other metrics, such as performance characteristics of a storage device. These characteristics may include, for instance, processing speeds of a controller, data write speeds of one or more integrated circuits, and/or various propagation delays between respective devices.

Each control logic of the power chip 100, including the redundancy management control logic 104, the write command control logic 106, and the write speed control logic 108 may comprise one or more logic circuits, logic gates, processors, memory, and/or any combination or sub-combination of the same. In some embodiments, one or more of the control logic of the power chip 100 may be combined into a single control logic or may be separated in multiple control logics. As an example, the write command control logic 106 and the write speed control logic 108 may be combined to form, for instance, a write operation control logic.

In an example operation of the power chip 100, one or more of the capacitors of the array 102 may be charged. The capacitors of the array 102 may be charged responsive, at least in part, to a storage device initializing and/or based, at least in part, on the redundancy management control logic 104 selectively enabling capacitors, as described above. The power sensor 120 may begin to monitor a power supply (e.g., voltage and/or current provided by the power supply), for instance, of the storage device. If a power loss is detected, the power sensor 120 may provide a power loss control signal to the write command control logic 106 indicating the power loss has occurred. In response to the power loss, capacitors of the array 102 may begin to provide power to the storage device. In one embodiment, power may be provided redundantly to the power supply. That is, the capacitors of the array 102 may be coupled to the power supply before the power loss and maintain the power level of the power supply when the power loss occurs. In another embodiment, the capacitors may be selectively coupled to the power supply in response to the power loss and maintain the power level of the power supply for a period of time thereafter. The capacitors may be selectively coupled, for example, based on the power loss control signal provided by the power sensor 120.

Responsive, at least in part, to receipt of the power loss control signal, the write command control logic 106 may provide a write command instructing the storage device to write data stored in the buffer cache of the storage device to one or more integrated circuits, such as a memory. As described, in at least one embodiment, the write command may be provided to a controller of the storage device. Data stored in the cache buffer of the storage device may be written using power provided by the capacitors of the array 102. During the write operation, power may be provided to all components of the storage device, or may be provided only less than all components of the storage device. For example, in one embodiment, power may be provided to the controller, the buffer cache, and any integrated circuits to which the write data is to be written. The write command control logic 106 may subsequently send a reset command to the controller of the storage device, thereby resetting various state machines and/or timers of the storage device. The reset command may be provided by the write command control 106 either after a particular amount of time has elapsed or after receiving a signal indicating that the write has completed.

Figure 2A:
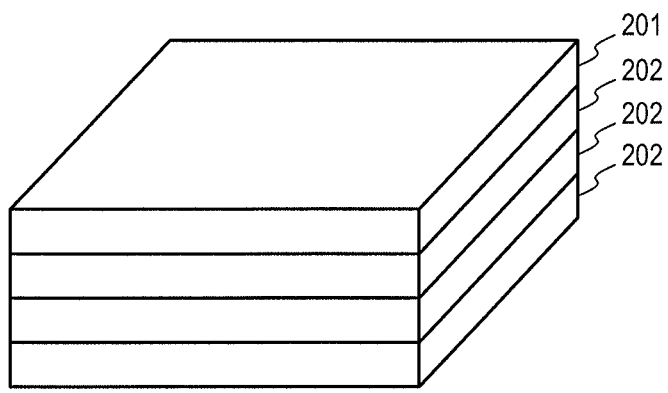
FIG. 2a is a block diagram of a chip package that may include the power chip of FIG. 1 according to an embodiment of the invention.

FIG. 2a is a block diagram of a chip package 200 according to an embodiment of the invention. The chip package 200 may include a power chip 201 and a plurality of integrated circuits 202. The power chip 201 may be implemented using the power chip 100 of FIG. 1. Each of the integrated circuits 202 may comprise any integrated circuit known in the art, now or in the future, such as a memory or controller, and will not be discussed further in the interest of brevity. The power chip 201 and the plurality of integrated circuits 202 may be arranged in a stacked configuration and further may be coupled to one another, for example, using through-silicon-vias (TSVs) and/or wire-bonding.

The power chip 201 may be configured to provide power to one or more components, including one or more integrated circuits, by maintaining the power level of a power supply during a power loss. Thus, the power chip 201 may be configured to provide power to one or more of the integrated circuits 202 of the chip package 200 as well as devices not included in the chip package 200, such as additional integrated circuits and/or a controller.

In some embodiments, a power chip 201 may be configured to selectively provide power to particular components. For example, the power chip 201 may be configured to provide power only to one or more of the integrated circuits 202 located in the chip package 200, or may be configured to provide power only to one or more devices located outside of the chip package 200. Furthermore, the power chip 201 may be configured to provide power to individual devices using respective sets of capacitors. As an example, the power chip 201 may assign respective sets of capacitors of an array, such as the array 102, to power corresponding integrated circuits 202 in the chip package 200. The power chip 201 may, for instance, be configured to power a first integrated circuit using a first half of a plurality of capacitors and power a second integrated circuit using a second half of the plurality of capacitors.

While one power chip 201 and three integrated circuits 202 are illustrated in the chip package 200 of FIG. 2a, it will be appreciated by those having ordinary skill in the art that the chip package 200 may include any number of power chips 201 and any number of integrated circuits 202. For example, the chip package 200 may comprise two power chips 201 and two integrated circuits 202, or may comprise three power chips 201 and five integrated circuits 202.

Figure 2B:
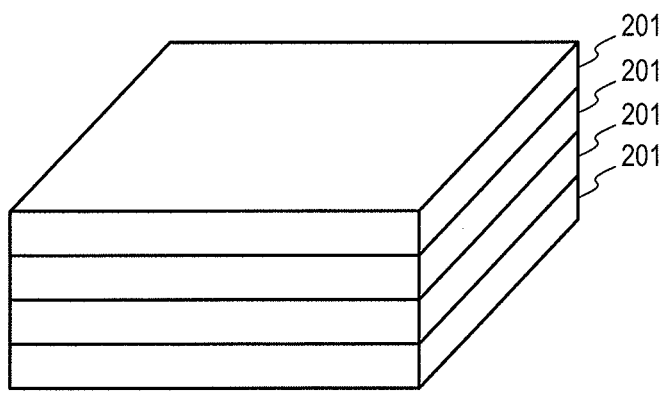
FIG. 2b is a block diagram of a chip package that may include the power chip of FIG. 1 according to an embodiment of the invention.

FIG. 2b is a block diagram of a chip package 250 according to an embodiment of the invention. The chip package 250 includes a plurality of power chips 201 that have been previously described with respect to the chip package 200 of FIG. 2a. The power chip 201 may be arranged in a stacked configuration and further may be coupled to one another, for example, with through-silicon-vias (TSVs) and/or wire-bonding. Operation of each of the plurality of power chips 201 is as previously described with respect to FIG. 2a. Consequently, a detailed description of the operation will not be repeated in the interest of brevity.

Each of the plurality of power chips 201 may be configured to provide power to maintain a power level of a power supply during a power loss. The power may be provided, for example, such that data may be written from a buffer cache to an integrated circuit to prevent loss of the data stored in the buffer cache. In doing so, the plurality of power chips 201 of the chip package 250 may be configured to provide power directly to the power supply, thereby powering any devices coupled to the power supply. In another embodiment, each of the plurality of power chips 201 may be configured to provide power to one or more devices, respectively. In this manner, all devices may be powered, or only those devices needed to complete a write operation may be powered.

As described, a power chip, such as the power chip 100 of FIG. 1, may be configured to provide a write command to a controller of a storage device based, at least in part, on the detection of a power loss. In embodiments in which multiple power chips are operating simultaneously, any number of a plurality of power chips may be configured to provide a write command. For example, in one embodiment, one of a plurality of power chips may be configured to provide a write command while each of the plurality of power chips may be configured to provide power in response to a power loss. In other embodiments, all power chips may be configured to provide a write command.

Power chips may also be configured to provide power in various ways. Each of a plurality of power chips may, for instance, be configured to provide power simultaneously. Alternatively, power chips may be configured to sequentially, or in a partially overlapping manner, provide power such that at least one power chip provides power while data is written in turn. The manner in which each power chip provides power may be based, at least in part, on various timing control signals provided by a controller, or may be based on respective delays assigned to each power chip.

In many implementations, a buffer cache of a memory device may be configured to write a page of data during a write operation. As a result, one or more power chips, such as the power chip 100, must be configured to provide a sufficient amount of power as to allow the buffer cache to write up to a page of data. As an example, a cache buffer may require a capacitor having approximately 28 microfarads of capacitance to be coupled to a supply voltage such that sufficient power may be stored and provided for a page write. In one embodiment, a power chip may be configured to have approximately 8 microfarads of capacitance. Accordingly, at least four power chips may be required to provide power during a page write.

Figure 3:
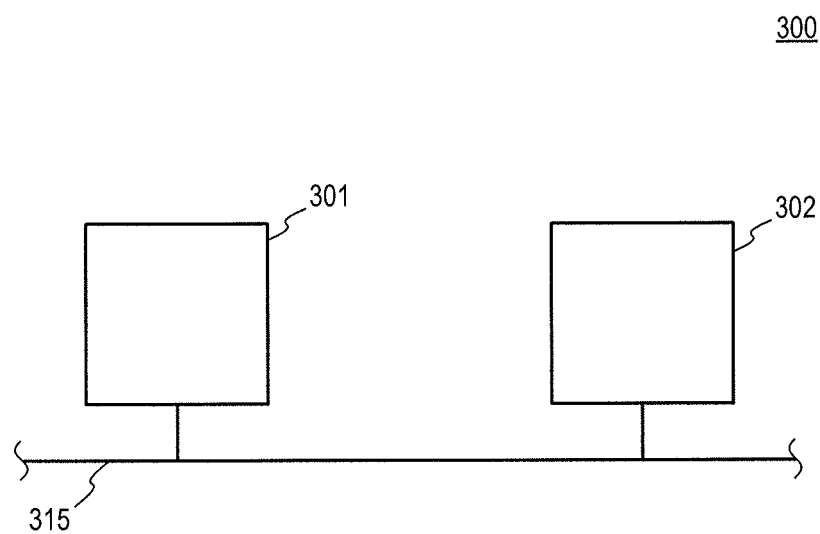
FIG. 3 is a block diagram of an apparatus that may include the power chip of FIG. 1 according to an embodiment of the invention.

FIG. 3 is a block diagram of an apparatus 300 that may include the power chip of FIG. 1 according to an embodiment of the invention. The apparatus 300 may include a power chip 301 and an integrated circuit 302. The power chip 301 may be implemented using the power chip 100 of FIG. 1 and further may be coupled to the integrated circuit 302 by a power bus 315. The integrated circuit 302 may be any integrated circuit known in the art, now or in the future and will not be discussed further in the interest of brevity. The power bus 315 may be coupled to a power supply (not shown) and further may be coupled to any number of devices in a storage device.

In operation, the power supply may provide, via the power bus 315, power to any number of devices coupled to the power bus 315. Responsive to a power level of the power supply dropping, a power sensor of the power chip 301 may detect the power loss of the supply voltage on the power bus 315. As a result, the power chip 301 may begin to provide power to devices coupled to the power bus 315, such as the integrated circuit 302. As described, power may be provided redundantly, or may be provided by coupling capacitors of the array of the power chip 301 to the power bus 315. Moreover, power may be provided to all devices coupled to the power bus 315, or may be provided to only those devices performing the write operation of data from the buffer cache to one or more integrated circuits.

Figure 4:
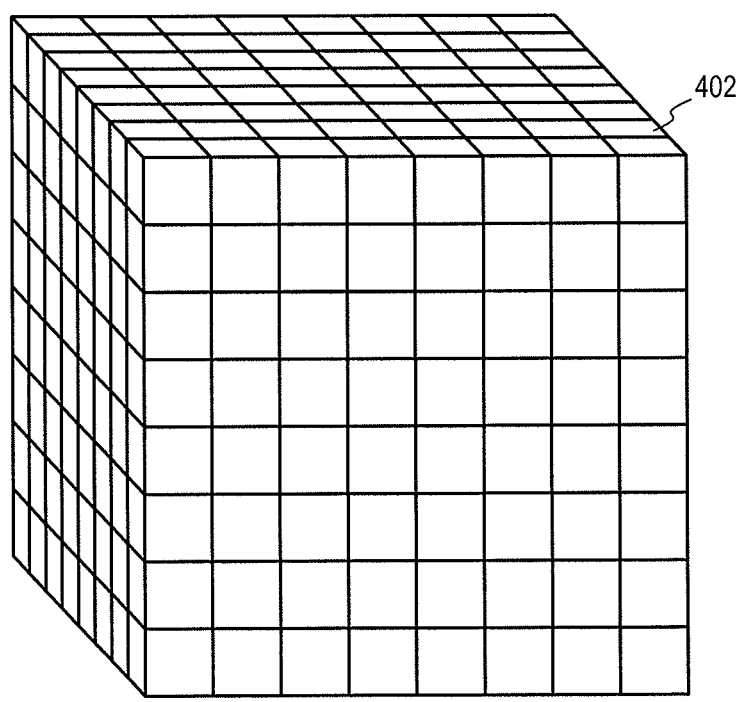
FIG. 4 is a perspective view diagram of an array that may be used in the power chip of FIG. 1 according to an embodiment of the invention.

FIG. 4 is a perspective view diagram of an array 400 that may be used in the power chip of FIG. 1 according to an embodiment of the invention. The array 400 may be used to implement the array 102 of FIG. 1 and may comprise a plurality of capacitors 402. As described, the array 400 may be formed using any fabrication process known in the art, including one or more fabrication processes similar (or identical) to those used to create tiers of vertically integrated memory, such as three-dimensional NAND memory. For example, a process used to create three-dimensional NAND word line plates may, in some embodiments, be used to make capacitor electrodes. In one embodiment, the array 400 may comprise up to 32 tiers. Because the array 400 may comprise similar elements as those in a vertically integrated memory, such as word line plates and CMOS devices used for decoding memory addresses, capacitors 402 of the array 400 may be addressable using an address decoder (not shown), and in some embodiments, each capacitor 402 may be individually addressable, or each tier of capacitors 402 may be addressable.

Each tier of the array 400 may comprise a pair of conductive layers, and each conductive layer may, for instance, be similar to a word line plate included in a three-dimensional NAND memory array. Each tier of the array 400 may further include an insulating layer, with each pair of conductive layers separated by the insulating layer. Each of the tiers may be divided (e.g., physically, logically, etc) into two dimensional arrays of capacitor 402, thereby allowing each layer and/or capacitor to be individually addressed and/or charged.

Figure 5:
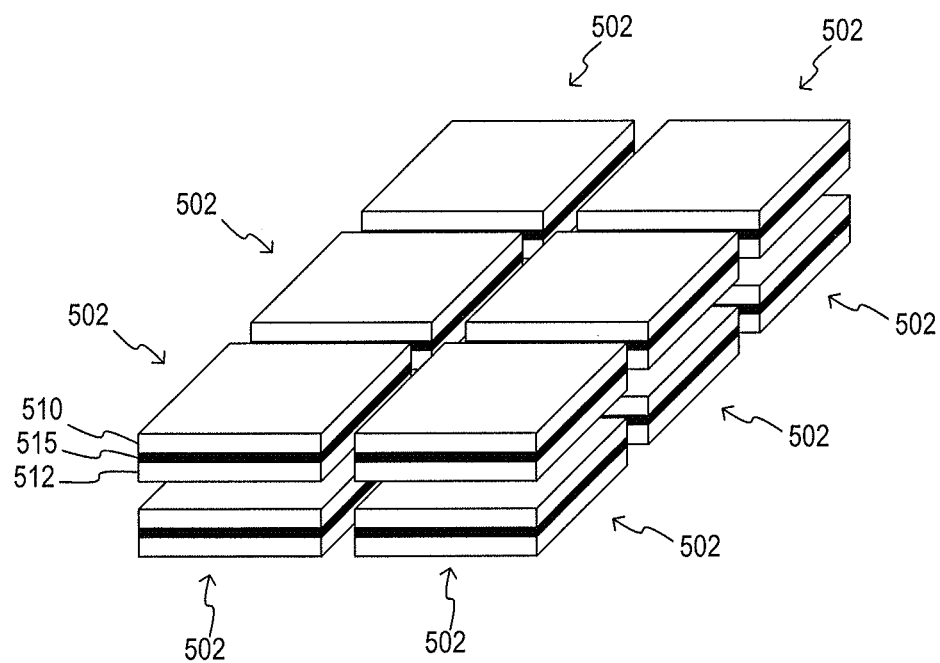
FIG. 5 is a perspective view diagram of a portion of an array that may be used in the array of FIG. 4 according to an embodiment of the invention.

FIG. 5 is a perspective view diagram of a portion of an array 500 that may be used in the array 400 of FIG. 4 according to an embodiment of the invention. While certain details are set forth below to provide a sufficient understanding of the array 500, it will be appreciated by one having skill in the art that particular details of well-known connections, timing protocols, and addressing operations have been omitted to avoid unnecessarily obscuring the described example.

The array 500 may include a plurality of capacitors 502, each of which may be used to implement a capacitor 402 of FIG. 4. As illustrated, each of the capacitors 502 may be physically and/or electrically separated, for instance, by an etching process (e.g., three-dimensional NAND memory etching process) such that a charge of a capacitor 502 may be electrically separated from other capacitors 502.

Each of the capacitors 502 may include capacitive layers 510, 512 and an insulating layer 515. As described with to capacitors 402 of FIG. 4, each capacitive layer 510, 512 may be similar to a WL plate included in a three-dimensional NAND memory, and may comprise any conductor or semiconductor material known in the art, now or in the future. Each insulating layer 515 may be located between the capacitive layers 510, 512 such that the capacitive layers 510, 512 may be properly charged. The insulating layer 515 may comprise any dielectric material known in the art, now or in the future, or may comprise any other material.

Figure 6:
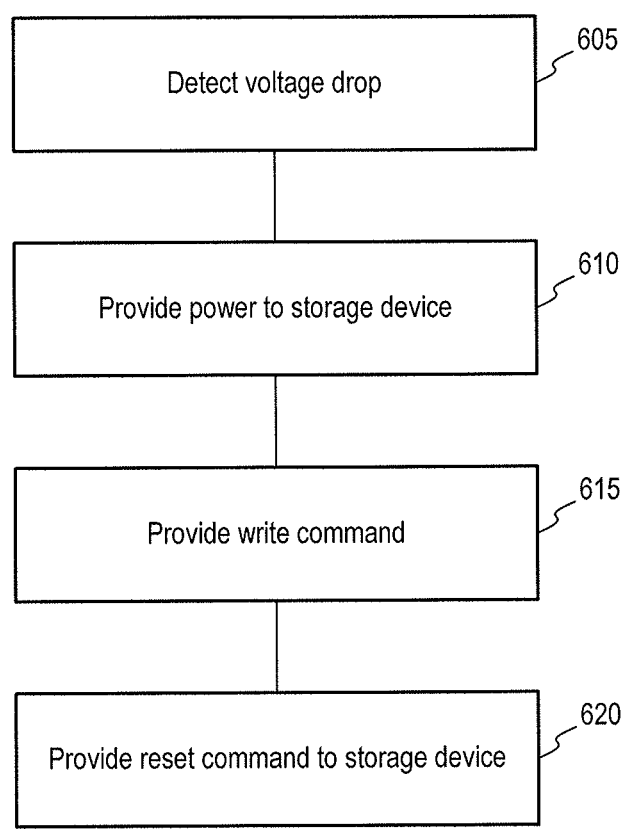
FIG. 6 is a method for preventing data loss during a power failure according to an embodiment of the invention.

FIG. 6 is a method 600 for preventing data loss during a power loss according to an embodiment of the invention. The method 600 may be implemented using, for example, any of the power chips described herein, such as the power chip 100 of FIG. 1. At a step 605, a power loss, for instance of a power supply, may be detected. The power loss may be detected by the power sensor 120 of FIG. 1. In response to the power loss, power may be provided to one or more components, such as components of a storage device, at a step 610. As described, providing power may include redundantly maintaining a power supply and/or coupling capacitors of the array 102 to the power supply to maintain the power level. Further in response to the power loss, a write command may be provided at a step 615, for instance, by the write command control logic 106 of FIG. 1, thereby instructing the storage device to write data stored in its buffer cache to one or more integrated circuits. At the method step 620, a reset command may be provided to the storage device, thereby resetting any state machines and/or timers included therein.

From the foregoing it will be appreciated that, although specific embodiments of the invention have been described herein for purposes of illustration, various modifications may be made without deviating from the spirit and scope of the invention. For example, while embodiments have been described with respect to providing power in a storage device (e.g., SSD), other embodiments may be directed to using a power chip as described herein in other devices including, but not limited to, digital media players, cellular telephones, laptop and desktop computers, tablets, various embedded systems, and any combination or subcombination thereof. Accordingly, the invention is not limited except as by the appended claims.

What is claimed is:

1. An apparatus, comprising:
a power sensor configured to detect a power loss and provide a power loss control signal responsive, at least in part, to detecting the power loss;
a write command control logic coupled to the power sensor and configured to receive the power loss control signal, the write command control logic further configured to provide a write command responsive, at least in part, to receipt of the power loss control signal;
an array including a plurality of capacitors configured to store power and further configured to provide power responsive, at least in part, to the power loss, wherein each of the plurality of capacitors is individually addressable for disabling and enabling; and
a write speed control logic configured to provide a write speed control signal based, at least in part, on a temperature signal.

2. The apparatus of claim 1, further comprising:
a redundancy management control logic coupled to the array and configured to selectively disable defective ones of the plurality of capacitors.

3. The apparatus of claim 1, further comprising:
a temperature sensor configured to provide the temperature signal based, at least in part, on a measurement of a temperature of the power chip.

4. The apparatus of claim 1, wherein the write speed control signal is further based, at least in part, on processing speeds, data write speeds, a propagation delay, or a combination thereof.

5. The apparatus of claim 1, wherein the write command control logic is further configured to provide a reset signal responsive, at least in part, to providing the write command.

6. The apparatus of claim 1, wherein each of the plurality of capacitors correspond to a respective memory array tier of a vertically integrated memory.

7. An apparatus, comprising:
a plurality of power chips each configured to detect a power loss of a power supply and provide power from respective arrays of capacitors to maintain a power level during the power loss responsive, at least in part, to detecting the power loss, wherein each capacitor of one of the respective arrays of capacitors is individually addressable for disabling and enabling.

8. The apparatus of claim 7, wherein one of the plurality of power chips is configured to provide a write command responsive, at least in part, to detecting the power loss.

9. The apparatus of claim 7, wherein the array of each of the plurality of power chips comprises a plurality of tiers, each of the tiers comprising a pair of conductive layers.

10. An apparatus, comprising:
an integrated circuit; and
a power chip coupled to the integrated circuit and configured to provide power to the integrated circuit with one or more of an array of individually addressable capacitors responsive, at least in part, to detecting a power loss, wherein the integrated circuit and the power chip are coupled together by through-silicon-vias.

11. The apparatus of claim 10, wherein the integrated circuit comprises a memory die.

12. An apparatus, comprising:
an integrated circuit; and
a power chip coupled to the integrated circuit, comprising:
an array having a plurality of capacitors configured to maintain the power level of a power supply responsive to a power loss, wherein each of the plurality of capacitors are individually addressable for disabling and enabling; and
a redundancy management control logic coupled to the array and configured to disable defective ones of the plurality of capacitors, wherein remaining ones of the plurality of capacitors remain enabled.

13. The apparatus of claim 12, wherein the power chip further comprises:

a power sensor configured to detect a power loss of a power supply and provide a power loss control signal responsive, at least in part, to detecting the power loss of the power supply; and a write command control logic coupled to the power sensor and configured to receive the power loss control signal, the write command control logic further configured to provide a write command responsive, at least in part, to receipt of the power loss control signal.

14. The apparatus of claim 13, wherein the power chip is further configured to provide a reset command responsive, at least in part, to providing the write command.

15. The apparatus of claim 13, wherein the write command is indicative of a write speed.

16. The apparatus of claim 12, wherein the integrated circuit and power chip are coupled by a power bus.

17. The apparatus of claim 12, wherein the plurality of capacitors includes first and second capacitors, the first capacitor corresponding to a first tier of the array and the second capacitor corresponding to a second tier of the array.

18. A method, comprising:
   detecting, with a power chip, a power loss of a power supply;
   responsive to detecting, with the power chip, the power loss of the power supply, providing, with the power chip, power to an integrated circuit; and
   responsive to providing, with the power chip, power to the integrated circuit, providing a write command, wherein said providing, with the power chip, power to an integrated circuit comprises providing power with a plurality of capacitors that are each individually addressable for enabling and disabling.

19. The method of claim 18, wherein the write command is indicative of a write speed.

20. The method of claim 18, wherein said providing, with the power chip, power to an integrated circuit comprises:
   providing, with the power chip, power to a memory.

21. The method of claim 18, wherein said detecting, with the power chip, a power loss of the power supply, comprises:
   detecting a decrease in voltage.

22. The method of claim 18, further comprising:
   resetting, with the power chip, a state machine, a timer, or a combination thereof.

23. The method of claim 18, wherein said detecting, with the power chip, a power loss of the power supply, comprises:
   detecting a decrease in current provided by the power supply.

24. The method of claim 18, wherein said detecting, with the power chip, a power loss of the power supply, comprises:
   detecting a decrease in power.

25. The method of claim 18, wherein said detecting, with the power chip, a power loss of the power supply, comprises:
   detecting a disruption in the provision of power by the power supply.

26. The method of claim 18, wherein said detecting, with the power chip, a power loss of the power supply, comprises:
   detecting events that effect the provision of power by the power supply.

* * * * *